(12) United States Patent
Hanson

(10) Patent No.: US 6,868,074 B1
(45) Date of Patent: Mar. 15, 2005

(54) MOBILE DATA DEVICE AND METHOD OF LOCATING MOBILE DATA DEVICE

(75) Inventor: Joel Hanson, Anamosa, IA (US)

(73) Assignee: MCI, Inc., Ashburn, VA (US)

( * ) Notice: Subject to any disclaimer, the term of this patent is extended or adjusted under 35 U.S.C. 154(b) by 0 days.

(21) Appl. No.: 09/539,803

(22) Filed: Mar. 30, 2000

(51) Int. Cl.[7] .............................. H04Q 7/00; H04Q 7/20; H04B 7/185; G06F 15/16
(52) U.S. Cl. ........................ 370/328; 370/328; 370/316; 455/456; 709/219
(58) Field of Search ................................. 370/320, 328, 370/335, 338, 342, 441, 479, 316, 410, 351, 312; 455/457, 456.1, 456.3, 456.5; 709/219

(56) References Cited

U.S. PATENT DOCUMENTS

| | | | |
|---|---|---|---|
| 5,479,479 A | 12/1995 | Braitberg et al. ............. 379/58 |
| 5,479,482 A | * 12/1995 | Grimes ..................... 455/556.1 |
| 5,508,707 A | 4/1996 | LeBlanc et al. ............ 342/457 |
| 5,528,248 A | 6/1996 | Steiner et al. ............... 342/357 |
| 5,600,706 A | 2/1997 | Dunn et al. .................... 379/59 |
| 5,602,903 A | 2/1997 | LeBlanc et al. ............. 379/60 |
| 5,642,303 A | 6/1997 | Small et al. ........... 364/705.05 |
| 5,675,524 A | 10/1997 | Bernard .................. 364/705.05 |
| 5,699,244 A | 12/1997 | Clark, Jr. et al. ........... 264/420 |
| 5,717,737 A | 2/1998 | Doviak et al. ................ 379/58 |
| 5,768,686 A | 6/1998 | LeBlanc et al. ........... 455/31.1 |
| 5,874,897 A | 2/1999 | Klempau et al. |
| 5,901,214 A | 5/1999 | Shaffer et al. .............. 379/220 |
| 5,928,325 A | 7/1999 | Shaughnessy et al. ...... 709/206 |
| 5,938,721 A | 8/1999 | Dussell et al. .............. 701/211 |
| 5,946,626 A | * 8/1999 | Foladare et al. ......... 455/456.1 |
| 6,052,584 A | 4/2000 | Harvey et al. |
| 6,154,658 A | 11/2000 | Caci |
| 6,233,327 B1 | 5/2001 | Petite |
| 6,292,698 B1 | * 9/2001 | Duffin et al. ................. 607/32 |
| 6,300,899 B1 | * 10/2001 | King ....................... 342/357.12 |
| 6,529,722 B1 | * 3/2003 | Heinrich et al. .......... 455/404.1 |
| 6,529,824 B1 | * 3/2003 | Obradovich et al. ........ 701/208 |
| 2002/0082665 A1 | * 6/2002 | Haller et al. ................... 607/60 |

FOREIGN PATENT DOCUMENTS

| | | |
|---|---|---|
| GB | 2285135 | 6/1995 |
| WO | WO 9914882 A2 * | 3/1999 |
| WO | 99/41682 | 8/1999 |

OTHER PUBLICATIONS

Teletype GPS Web Pages, printed Feb. 8, 2000.

"Where in the World is . . . You?," by Roland D. Joffe, pp. 1–4, printed Feb. 8, 2000.

(List continued on next page.)

Primary Examiner—Hanh Nguyen

(57) ABSTRACT

A method including providing a PDA having a processor, a memory coupled to the processor, a GPS receiver coupled to the processor and a RF transponder capable of communicating using Internet Protocol; storing user identification information in the memory; storing medical history information in the memory; determining location using the GPS receiver; transmitting the determined location to a service using the RF transponder; and in response to a request of emergency service by a user of the PDA, contacting the service and transmitting an emergency request to the service using the RF transponder. A PDA comprising a processor; a memory coupled to the processor; a GPS receiver coupled to the processor; and a wireless transponder capable of communicating using Internet Protocol, the PDA being configured to store user identification information in the memory, store medical history information in the memory, determine location using the GPS receiver, transmit the determined location to a service using the wireless transponder, and, in response to a request of emergency service by a user of the PDA, contact the service and transmit an emergency request to the service using the wireless transponder.

15 Claims, 6 Drawing Sheets

OTHER PUBLICATIONS

GPS Pilot: GPS Technology on your Palm Web Pages, printed Feb. 28, 2000.

Rand McNally StreetFinder GPS for the Palm V Web Pages, printed Feb. 28, 2000.

3Com/Palm Computing—Press Release Web Pages, printed Feb. 28, 2000.

GPS III Pilot Web Pages, printed Feb. 28, 2000.

Lucent Technologies Wireless Networks Web Pages, printed Feb. 8, 2000.

Planet IT Mobile Computing TechCenter: FCC Allows GPS–Enabled Wireless Handsets Web Pages, printed Feb. 8, 2000.

"Enhanced 911 Service Spurs Integration of GPS into Cell Phones," by Junko Yoshida, EE Times, Aug. 16, 1999 Web Pages, pp. 1–5, printed Feb. 8, 2000.

"Smelling Success for Wireless," by Leander Kahney, Nov. 5, 1999 Web Pages, printed Feb. 8, 2000.

* cited by examiner

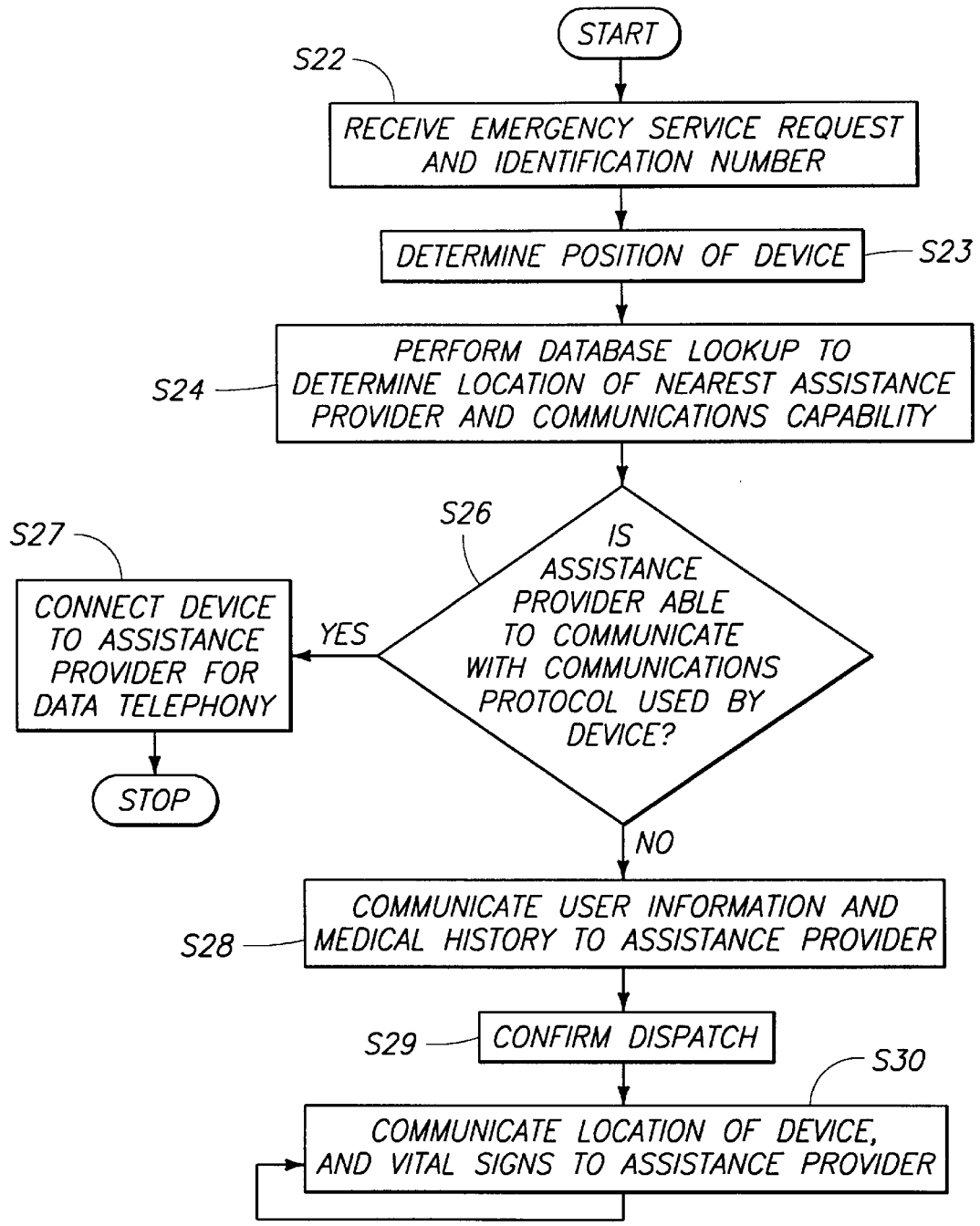

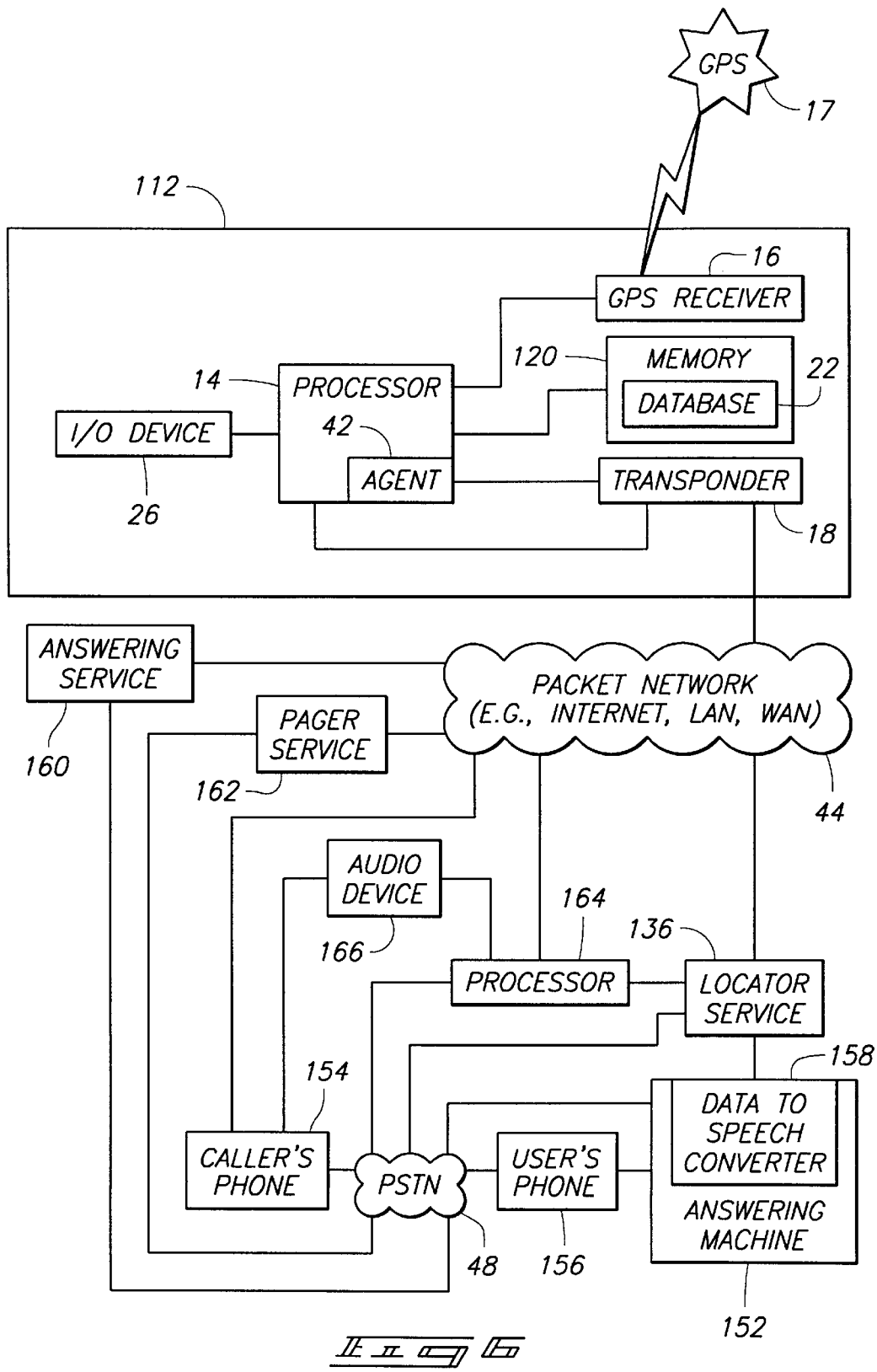

MOBILE DATA DEVICE AND METHOD OF LOCATING MOBILE DATA DEVICE

TECHNICAL FIELD

The invention relates to a system and method for providing user location and enhanced user information to 911 services with varied communication protocols.

BACKGROUND OF THE INVENTION

PDAs (personal digital assistants) are known in the art. Such devices are used to store and organize data, such as phone numbers, addresses, and other contact data, as well as calendars and schedules, and are portable, hand held devices. They typically have an operating system such as Windows CE. Some models are able to communicate using the Internet Protocol. For example, Palm, Inc. has a service plan that provides users of PDAs, such as the Palm series of handheld computers, wireless access to Internet content and e-mail.

It is known in the art to combine Global Positioning System (GPS) receivers with personal digital assistants. See, for example, the following U.S. Patents, all of which are incorporated herein by reference: U.S. Pat. Nos. 5,675,524 to Bernard; 5,669,244 to Clark, Jr. et al.; and 5,528,248 to Steiner et al. By doing so, the personal digital assistant is able to provide position information to the user. Navigation functions allow the user to navigate to a desired location, carrying the personal digital assistant along the way. Moving maps can track a user's progress in real time and show landmarks.

Emergency response services are known in the art. When someone is experiencing an emergency, they dial 911 and the operator receives address information on a monitor. The address information is obtained, for example, using address information in a telephone company database associated with the caller's phone number. The 911 operator can dispatch emergency personnel even if the caller is unable to speak or to communicate address information.

Determining the location of a user of a cell phone or other mobile phone is obviously more difficult than determining the location of a user of a conventional wired telephone, because such phones are mobile. Yet various techniques are emerging for doing so. See, for example, the following U.S. Patents, all of which are incorporated herein by reference: U.S. Pat. Nos. 5,901,214 to Shaffer et al; 5,602,903 to LeBlanc et al.; 5,600,706 to Dunn et al.; 5,508,707 to LeBlanc et al.; and 5,479,479 to Braitberg et al. Cellular systems could be overhauled to locate a caller's position by equipping cell sites to locate cell phones using triangulation. Alternatively, cell phones could be equipped with GPS receivers. A decision by the Federal Communications Commission (FCC) expanded the definition of 911 to include cell phones and may result in increased use of GPS receivers in cell phones. Proponents of a handset-based approach to 911 believe that a handset-based approach can likely be deployed with more accuracy and lower cost than a network based triangulation system.

It is also known to incorporate 911 emergency communication access into pagers. See, for example, U.S. Pat. No. 5,894,591 to Tamayo, which is incorporated herein by reference.

SUMMARY OF THE INVENTION

The invention provides emergency service request (e.g., 911) capability for mobile data devices or VoIP devices such as PDAs and wearable computers, and emergency service methods for such devices.

One aspect of the invention provides an E-911 method and apparatus for where data devices, such as PDAs, are used to communicate instead of cell phones and PSTN telephones. One aspect of the invention provides for use of the mobile data devices in connection with emergency services for people who use mobile data devices to communicate with each other.

In one aspect of the invention, the mobile data devices provide enhanced user information to emergency assistance providers such as 911 dispatch centers or assistance providers. In one aspect of the invention, enhanced user information includes user name, location, vital signs, relevant medical history such as blood type, known allergies, past and existing conditions and treatments, and other characteristics such as age, sex and weight.

A problem is how to enable data devices to provide enhanced user information to emergency services providers where the providers utilize varied communications protocols.

One aspect of the invention provides a method wherein a user with a mobile data device, e.g., a Palm Pilot™, registers his identity with a locator service. Further, the data device continually registers its location, e.g., via GPS coordinates or info, to the locator service. When the user requests emergency service, such as by dialing 911 using the data device, the data device contacts the locator service. The locator service in turn queries a directory service or database for the nearest assistance provider, e.g., the local 911 location and the communication protocols utilized by the assistance provider.

In one aspect of the invention, if the mobile data device is equipped to communicate directly with the assistance provider, communication is established. If not, the locator service establishes the communication and submits a message to the assistance provider with the physical location, name, medical history information (e.g., blood type, known allergies) and other pertinent information about the user. In one aspect of the invention, the user and the assistance provider are connected to speak to each other via data telephony, e.g., voice over IP.

In a further aspect of the invention, the mobile data device provides the vital signs of the user contacting 911. The mobile data device is provided with an input, and a personal monitoring device is coupled to the input. Emergency service requesters using the device are diagnosed more quickly and the 911-dispatch center is able to provide more appropriate responses to medical emergencies. This method enables automatic transmission of user characteristics that will aid in medical triage, diagnosis and treatment.

One aspect of the invention provides a mobile data device configured to provide dynamic location information for a data device to emergency assistance providers.

Another aspect of the invention provides a mobile data device configured to provide dynamic vital sign information about the user of the data device to an emergency assistance provider.

Another aspect of the invention provides a mobile data device configured to provide static information to an emergency assistance providers.

Another aspect of the invention provides a method of determining communication protocols available with emergency assistance providers.

Another aspect of the invention provides a method of determining the nearest emergency assistance provider to the location of a mobile data device.

Offering E-911 to VoIP devices will allow these devices to replace existing PSTN devices, such as the telephone, instead of just augmenting them. Also, by providing other pertinent medical information to the 911 dispatch, e.g. blood type, known allergies, user name, current medications, current medical condition, the invention improves upon the existing E-911 service.

BRIEF DESCRIPTION OF THE DRAWINGS

FIG. 5 is a flowchart illustrating operations performed at a locator service in response to an emergency request from the data device.

FIG. 6 is a block diagram of a system in accordance with one aspect of the invention.

DETAILED DESCRIPTION OF THE PREFERRED EMBODIMENTS

Figure 1:
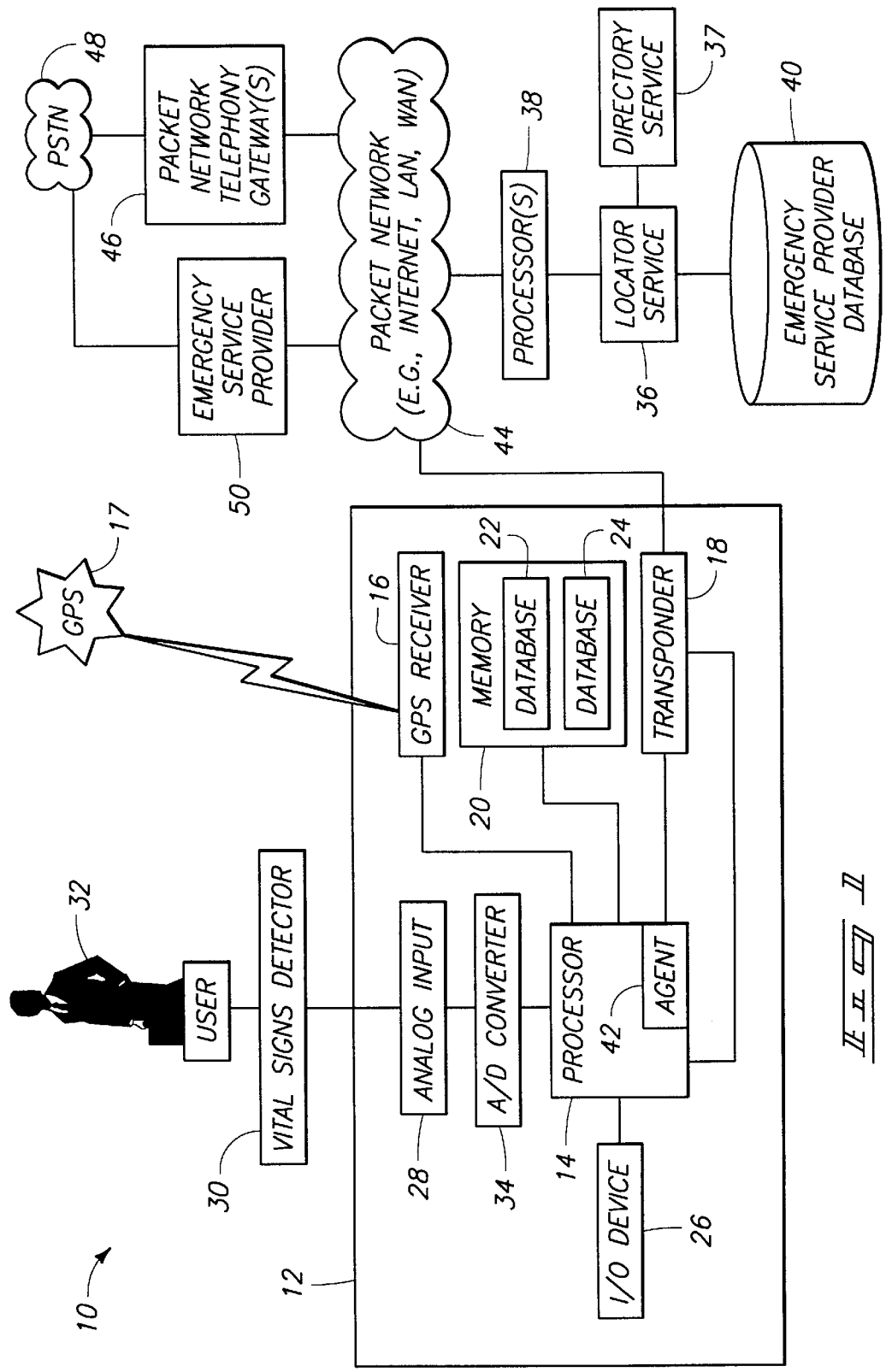
FIG. 1 is a block diagram of a system in accordance with one aspect of the invention.

FIG. 1 shows a system 10 in accordance with one aspect of the invention. The system 10 includes a mobile data device 12, such as a PDA (e.g. PalmPilot™) or other handheld personal data device capable of being used for communicating using Voice over Internet Protocol.

The mobile data device 12 includes a processor 14. The processor 14 can be, for example, an integrated circuit microprocessor.

The data device further includes a GPS receiver 16 coupled to the processor 14. The GPS receiver receives information from global positioning satellites 17 to determine the position (e.g., latitude and longitude) of the data device.

The data device 12 further includes a wireless transponder 18 used for communicating using Voice over Internet Protocol. This can be, for example, a RF modem or other device. In the illustrated embodiment, the data device 12 is not configured for use with a cellular telephone network, and is not a cell phone but instead is a PDA or organizer type of device.

The data device 12 further includes a memory 20 coupled to the processor 14. The memory 20 defines a database 22 for storing schedules, calendars, addresses, names, phone numbers, other contact information, and other information of the type stored in an organizer, PDA, or Palm PilotT™. The memory 20 also stores medical history information regarding the user, as well as information about the user, such as name, address, etc. The memory 20 also defines a database 24 for storing information about emergency assistance providers, as will be discussed below.

The data device 12 further includes a data input/output device 26 such as a keyboard and screen, or a touch screen that could be manipulated, for example, with a stylus.

The data device 12 further includes an input 28 for receiving vital signs from a vital signs detector 30 used by a user 32. The vital signs detector 30 can be, for example, a heartbeat (pulse) detector, or other vital signs detector. If a heartbeat detector is used, it can be of the type used by joggers (e.g. with a sensor assembly that clips on to a earlobe and a cable from the sensor assembly to a quick disconnect connector that couples to a mating connector of the data device), or a heartbeat sensor mounted directly on the data device, such as a thumb sensor. In one embodiment, the input 28 is an analog input, and the data device 12 further includes an analog to digital converter 34.

In operation, in one embodiment, the user 32 with the data device 12 registers his or her identity with a location or locator service 36 via a processor 38. In the illustrated embodiment, the locator service 36 is a distributed service that dynamically keeps track of device locations in a manner similar to the DNS system that tracks domain name IP locations. The processor 38 is an optional intermediary server between the data device 12 and the locator service 36. In one embodiment, the processor 38 is a web server or WAP server with which the data device 12 communicates. The server 38 passes messages to and from the locator service 36. In an alternative embodiment, the data device 12 communicates directly with the locator service 36.

The data device 12 continually tracks its location, e.g., determines longitude and latitude via GPS 16 or other location mechanism. Further, the user of the data device 12 has the option to download a database of emergency center locations indexed by location from an emergency assistance or emergency assistance provider database 40 via the locator service 36 via the processor 38. The emergency assistance provider database 40 contains, among other things, communication protocols available at each emergency center, e.g., telephony, H323, SIP, MGP, Voice via Instant Messenger, video or other communications protocols. The emergency assistance provider database 40 also contains addresses for each of the protocols, e.g., phone number, IP address, IM user name, or other appropriate address.

When the user 32 wishes to summon emergency services, i.e. "call 911," the user inputs an appropriate code (such as 911) to the data device 12 using the input/output device 26 or another input (not shown) of the data device 12. In one embodiment, the data device 12 first searches for existence of or data in internal database 24 that may contain data for an emergency center nearby. If the database 24 exists and contains data, the device 12 compares the distance between its location and the nearest emergency assistance provider contained in the database 24. If the distance is within a specified or calculated threshold, the data device determines the protocol and address used by the closest emergency assistance provider.

If the database 24 does not exist in the data device, or if the distance to the nearest emergency assistance provider does not fall within a predetermined or calculated threshold, the data device contacts a centralized database, using the locator service 36, to obtain information about emergency assistance providers.

After determining the communications protocol and address of the nearest emergency assistance provider, the data device 12 sends a message to the emergency provider via agent 42, packet network 44, and optionally packet network telephony gateway 46 and PSTN 48 if the communications protocol is narrow-band telephony. In the illustrated embodiment, the data device 12 is able to transmit and receive data packets. The message contains any text of voice contributed by the data device user 32 via agent 42, as well as pertinent static and dynamic information relating to the user 32. In one embodiment, the agent 42 is software executed by the processor 42 to provide for communications between the data device 12 and the emergency assistance provider 50 via packets. Preferably, communication will occur via packets passed back and forth on the packet network 44. The packets may contain voice data as well as text and command data. Examples of software that could be used for the agent 42 include IP telephony clients and instant messenger clients.

Information provided to the emergency assistance provider 50 from the device 12 can include, for example, user name, address, emergency contact information, blood type, allergies, weight, dynamic vital signs collected by the vital signs detector, and other static medical history. If communications protocols allow, the user 32 may converse with emergency assistance provider 50 via the agent 42.

Figure 2:
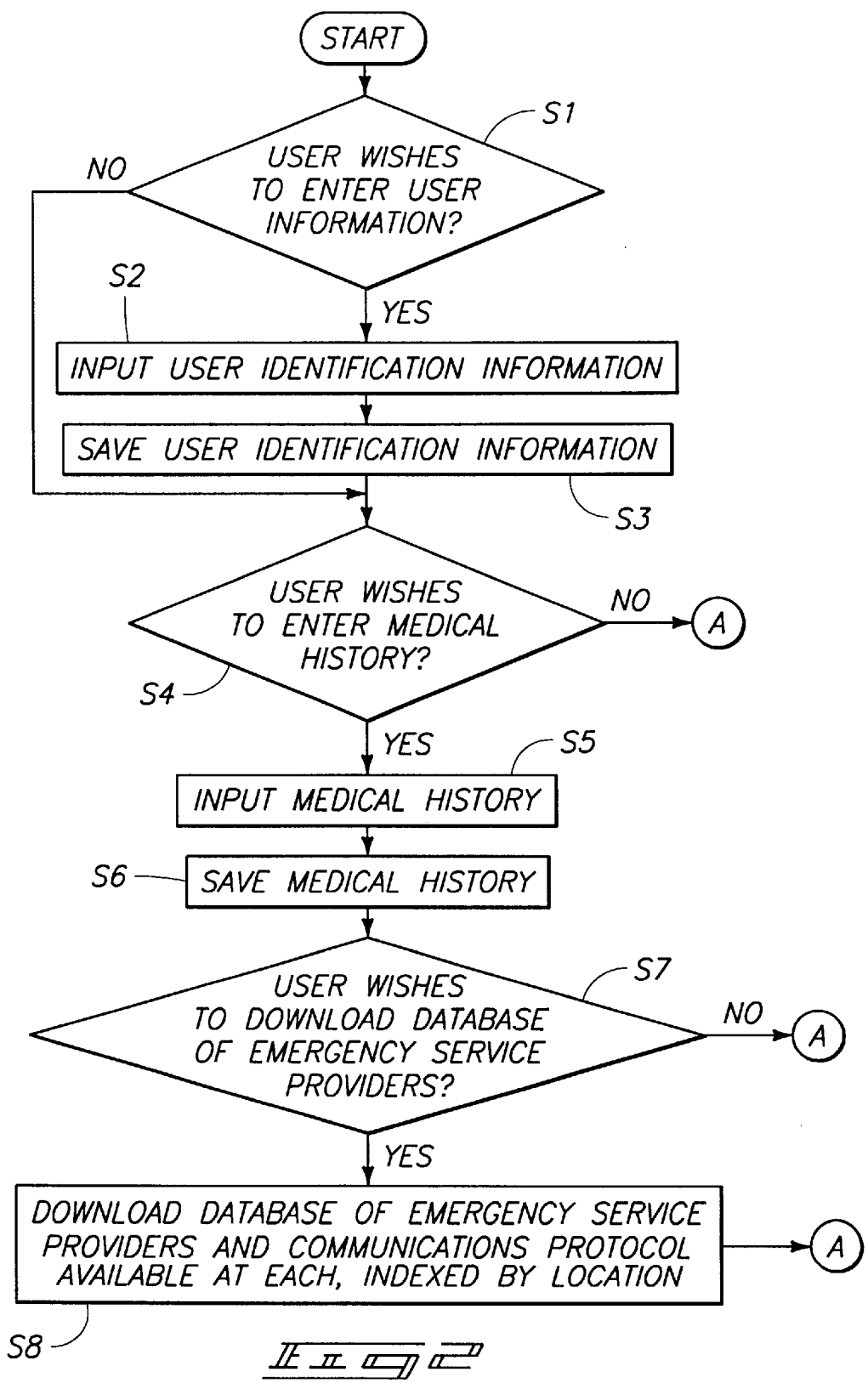
FIG. 2 is a flowchart of set-up operations carried out by a data device, in accordance with one aspect of the invention, prior to a user requesting emergency service.

FIG. 2 is a flowchart of set-up operations carried out by a data device 12, in accordance with one aspect of the invention, prior to a user requesting emergency service.

In step S1, the processor 14 determines if the user wishes to enter user information. If so, the processor 14 proceeds to step S2. If not, the processor 14 proceeds to step S4.

In step S2, the user identification information is received (input) from the user via the I/O device 26, and in step S3, the user identification information is saved in memory 20. After performing step S3, the processor proceeds to step S4.

In step S4, the processor 14 determines whether the user wishes to enter medical history information or data. If so, the processor 14 proceeds to step S5. If not, the processor 14 proceeds to step S9.

In step S5, the user's medical history information or data is received (input) from the user via the I/O device 26, and in step S6, the user identification information is saved in memory 20. After performing step S6, the processor 14 proceeds to step S7.

In step S7, the processor 14 determines if the user wishes to download a database of emergency assistance or service providers and their locations. If so, the processor 14 proceeds to step S8. If not, the processor 14 proceeds to step S9.

In step S8, the database of emergency assistance providers (and communications protocol available at each, in one embodiment), indexed by location, is downloaded, using the transponder 18, and stored in database 24. After performing step S8, the processor 14 proceeds to step S9.

Figure 3:
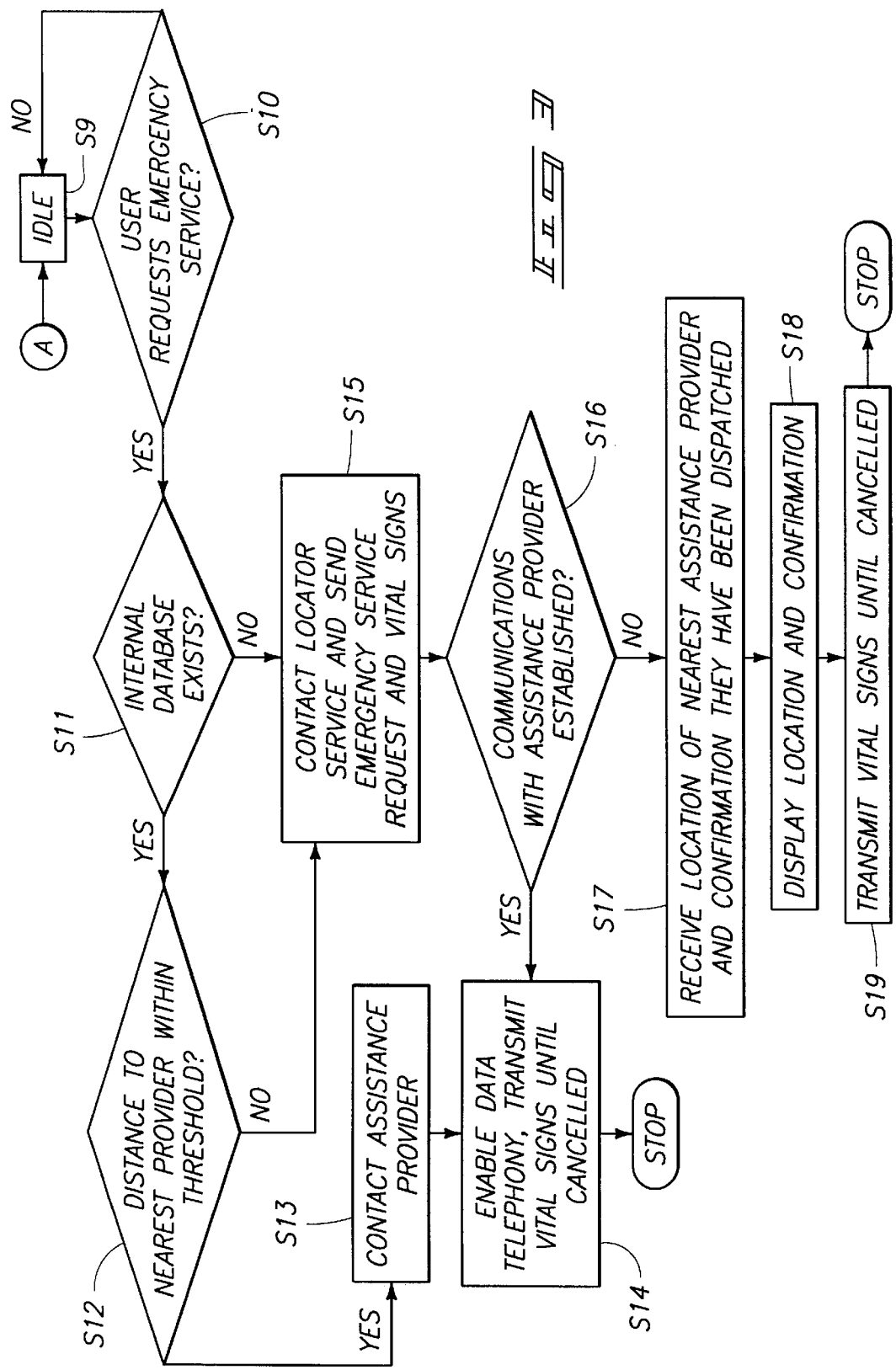
FIG. 3 is a flowchart that is a continuation of the flowchart of FIG. 2 and that illustrates operations carried out by the data device when a user requests emergency service.

FIG. 3 is a flowchart that is a continuation of the flowchart of FIG. 2 and that illustrates operations carried out by the data device when a user requests emergency service.

Step S9 is an idle process with respect to the routine of FIGS. 2–3. When in the idle state of step S9, the processor carries out other operations, such as those related to addresses, scheduling, etc., while waiting for a user to request emergency service.

In step S10, the processor 14 determines whether the user requested emergency service. If so, the processor 14 proceeds to step S11. If not, the processor proceeds to step S9. The processor 14 periodically performs the test of step S10 or otherwise proceeds to step S11 when a user requests emergency service.

In step S11, the processor 14 determines whether an internal database 24 exists and contains data. If so, the processor 14 proceeds to step S12. If not, the processor 14 proceeds to step S15.

In step S12, the processor 24 determines whether the distance to the nearest emergency assistance provider is within a predetermined threshold and supports a communications protocol the device 12 is capable of using. If so, the processor 14 proceeds to step S13. If not, the processor 14 proceeds to step S15.

In step S13, the processor 14 causes the device 12 to contact the nearest assistance provider. After performing step S13, the processor 14 proceeds to step S14.

In step S14, the processor 14 enables data telephony and effects transmission of the user's vital signs (assuming vital signs are being input to the device 12) to the emergency assistance provider until the assistance provider cancels the transmission.

In step S15, the processor 14 causes the device 12 to contact the locator service and send an emergency service request as well as the user's vital signs (assuming vital signs are being input to the device 12). The locator service then performs the steps in FIG. 5, including determining whether the nearest assistance provide is able to communicate with a communications protocol the device 12 is capable of using.

In step S16, the processor 14 of the device 12 determines whether communications with an assistance provider has been established (i.e., whether the locator service connected the device 12 with an assistance provider for communications). If so, the processor proceeds to step S14. If not, the processor proceeds to step S17.

In step S17, the device 12 receives the location of the nearest assistance provider and confirmation they have dispatched. The location of the nearest assistance provider or confirmation of dispatch, or both, is displayed on the screen or other I/O device 26, in one embodiment, in step S18.

In step S19, the processor 14 effects transmission of the user's vital signs (assuming vital signs are being input to the device 12) to the locator service until an assistance provider or the locator service cancels the transmission.

Figure 4:
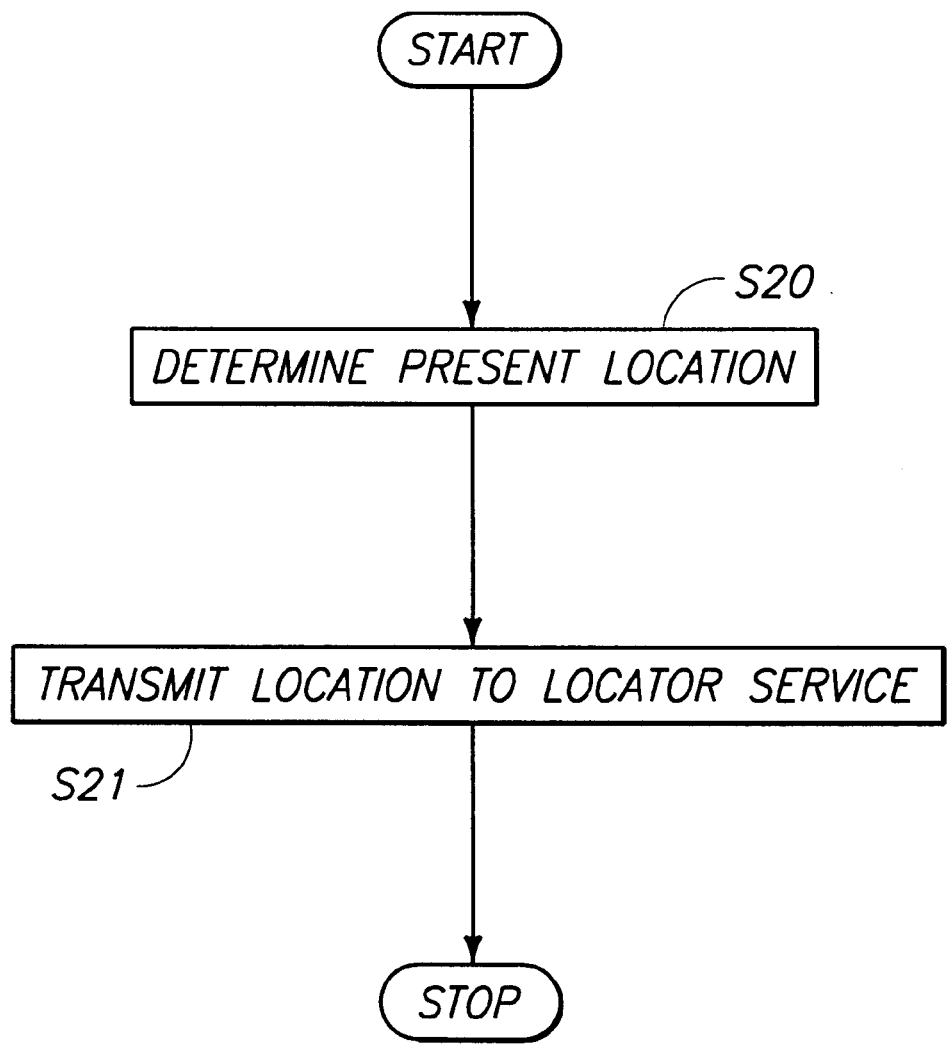
FIG. 4 is a flowchart of an operation periodically or continually carried out by the data device, in accordance with one aspect of the invention.

FIG. 4 is a flowchart of an operation periodically or continually carried out by the data device, in accordance with one aspect of the invention.

In step S20, the processor 14 causes the present location of the device 12 to be determined, using the GPS receiver. After performing step S20, the processor proceeds to step S21.

In step S21, the processor 14 effects transmission of the location of the device 12 to the locator service. Steps S20 and S21 are repeated either continually, or periodically.

FIG. 5 is a flowchart illustrating operations performed at a computer or server at a locator service in response to an emergency request from the data device 12.

In step S22, the emergency service request is received from the device 12 along with a unique identifier identifying the device 12, such as an identification number, account number, serial number, name of the user, etc. After performing step S22, the locator service performs step S23.

In step S23, the position of the device 12 is determined. This can be by a recent transmission from the device 12, or from a triangulated estimate based on a movement and direction pattern determined from a stored recent history of positions of the device 12. After performing step S23, the locator service performs step S24.

In step S24, the locator service performs a database lookup (e.g., queries a directory service 37 or a local database) to determine the location of the nearest or most appropriate assistance provider (or nearest assistance provider capable of handling an emergency of a type indicated by the device 12 or nearest assistance provider with the capacity/ability to handle the request) and their communications capabilities. After performing step S24, the locator service proceeds to step S26.

In step S26, the locator service determines if the selected assistance provider is able to communicate with a communications protocol used by the device 12. If so, the locator service proceeds to step S27. If not, the locator service proceeds to step S28.

In step S27, the locator service connects the device 12 to the assistance provider for data telephony.

In step S28, the locator service passes about the user (name, address, family members to contact in case of emergency, phone numbers), and medical history information, and vital signs, to the assistance provider. After performing step S28, the locator service proceeds to step S29.

In step S29, the locator service communicates with the device 12 to confirm that the assistance provider has been dispatched (after the locator service receives confirmation from the assistance provider). After performing step S29, the locator service proceeds to step S30.

In step S30, the locator service continually or periodically passes information relating to the location of the device 12 (or, alternatively, transmits the new location of the device 12 only whenever there has been a change in location of the device 12), and vital signs, to the assistance provider.

The device 12 can be used with multiple other methods, in various alternative embodiments of the invention that will now be described.

Panic Button User Locator Service

In one embodiment, the device 12 (FIG. 1) can be used with a panic button user locator service. This embodiment provides a method to provide emergency assistance to a user's location with or without user intervention.

In operation, a mobile data device 12 is placed on or in the vicinity of a user. The data device 12 registers its identity with a locator service 36. Further, the data device continually registers its location, e.g., via GPS coordinates/info, to the locator service. Still further, the data device 12 continually monitors the condition of the user 32 via the vital signs detector 30. When the user 32 needs to be located to provide assistance (e.g., when the location of the user is not obvious or known), the user submits a signal from the data device to the locator service, e.g., presses a button, stops breathing, or exhibits other detectable signs of distress. The locator service 36 determines the last known position of the registered data device 12, queries directory service 37 for the nearest assistance provider, e.g., the local 911-dispatch center, and submits a message to the assistance provider that provides the user's location and the reason why the user needs assistance.

The user can program how the device 12 acts upon indication of distress, for example, to notify a personal security company upon indication of distress. In an alternative embodiment, the locator service can contact multiple assistance providers, e.g., the user's family, office, and personal security company as well as the nearest 911 dispatch center.

Prior art panic button services provide assistance to a user location based on a fixed address or telephone number. Thus upon signaling the service a phone call is made to the user. If the phone call is not answered, then assistance is dispatched to the user's known address. This prior art service requires that the user be at home.

The described panic button method, which uses device 12 with a locator service 36 allows users to request or signal for assistance from any location on earth. Thus, a personal data device (PDA) is provided that could be offered an assistance service.

In addition to a user-invoked signal, the PDA can be linked to various vital signs detectors or devices located on the user's person that monitor health. In one embodiment, information from the devices indicating distress signal for assistance even if the user were incapacitated.

Various alternative embodiments do not necessarily require a vital signs detector 30 or the database 24, or storage of medical history information in memory 120. These alternative embodiments will be described in connection with FIG. 6, which shows a device 112 that is similar to the device 12 of FIG. 1, like reference numbers indicating like components, except that the analog input 28, A/D converter 34, and database 24 are omitted. The memory 120 still includes a database 22 for storing addresses, schedules, and other organizer type information typically included in a Palm Pilot™ or other PDA, but does not necessarily include the database 24 or medical history information.

Answering Machine User Locator Service

FIG. 6 shows an answering machine 152 that is configured to register its identity and communicate with locator service 136, e.g., via a continual Internet connection. Thus, in the illustrated embodiment, the answering machine 152 can be coupled to both the Internet and to a phone line, for answering incoming calls, at the same time. A user with mobile data device 112 registers his or her identify with the locator service 136. The user configures an account with the locator service to notify callers of his location when the answering machine 152 receives a call and queries the locator service 136. It can be assumed that there are some callers to whom the user will not want location information provided. Therefore, in one embodiment, the user specifies with the locator service what callers can be given location information or what callers cannot be given location information. The data device 112 continually or periodically registers its location to the locator service 136, e.g., using GPS receiver 16.

When the answering machine 152 receives a call from a caller's phone or caller station 154 (e.g., assuming the user's phone 156 isn't answered), the answering machine 152 queries the locator service 136. The locator service 136 provides the current location of the user of the device 112 to the answering machine 152. The answering machine 152 in turn translates the location information to speech, and delivers the information to the caller at phone 154. The answering machine 152 includes a data to speech converter 158 for this purpose.

For example, assume a caller using a phone 154 dials his grandmother's phone number. The grandmother's answering machine 152 picks up. Depending on who the caller is, based on PIN or Caller ANI or other Caller ID information, the caller is given the option of learning the location of the grandmother. In one embodiment, a billing event is created if the caller accepts. If the caller accepts, the answering machine 152 communicates with locator service 136 to obtain information on the grandmother's whereabouts. The answering machine 152 provides the grandmother's location to the caller, using the data to speech converter 158. In one embodiment, the answering machine 152 further provides directions to the grandmother's location to the caller, if requested. This is performed, e.g., by querying a database or service such as Mapquest™ using the Internet connection and looking up the address of the caller based on Caller-ID information. The caller may then leave a message on the answering machine 152.

In one embodiment, the answering machine 152 includes an Internet integrated circuit designed for appliances, such as an integrated circuit available from iReady Corporation, 2903 Bunker Hill Lane, Suite 200, Santa Clara, Calif. 95054-1141, or a similar integrated circuit.

Thus, this embodiment provides a locator service for use with Internet-ready answering machines. Without reliance on the communications provider, the user is able to configure his or her answering machine to communicate with a locator service to offer information about his or her location.

Network-Based Answering Service User Locator Service

An alternative embodiment is similar to answering machine embodiment described above, except that an answering service 160 is used instead of the answering machine 152. The answering service 160 may be automated or manual, or a combination (e.g., a human operator comes on the line when requested or when particular functions are requested).

The answering service 160 of FIG. 6 is a network based answering service that is configured to communicate with a locator service 136, e.g., via a continual Internet connection. A user with mobile data device 112 registers his or her identify with the locator service 136. The user configures an account with the locator service to notify callers of his location when the answering service 160 receives a call and queries the locator service 136. In one embodiment, the user specifies with the locator service 136 or answering service 160 what callers can be given location information or what callers cannot be given location information. The data device 112 continually or periodically registers its location to the locator service 136, e.g., using GPS receiver 16.

When the answering service 160 receives a call from a caller's phone or caller station 154 (e.g., assuming the user's phone 156 isn't answered), the answering service 160 queries the locator service 136. The locator service 136 provides the current location of the user of the device 112 to the answering service 160. The answering service 160, if automated, translates the location information to speech, and delivers the information to the caller at phone 154. The answering service 160, if automated, includes a data to speech converter that is used for this purpose, or a human operator comes on the line to provide this information. Directions to the user are also provided, in one embodiment, if requested.

In one embodiment, the answering service 160 and locator service 136 are combined or integrated; e.g., a single service provider or company performs both services, possibly using the same server to perform both services.

Find Me/Follow Me—On the Map

Another aspect of the invention provides a method and apparatus to provide, via a find me/follow me service, information about a user's location to callers/inquirers.

A user with a mobile data device 112 registers his identity with a locator service 136. The user configures his or her account at the locator service 136 to provide physical location and directions to callers (or specified callers). The data device continually registers its location, e.g., using the GPS receiver 16, to the locator service 136. When a caller using phone 154 attempts to locate the user via a find me/follow me type service, and the user has configured his account to provide physical location and directions, the locator service 136 provides information to the caller on the user's location and directions on how to reach the user.

For example, assume a user does not wish to be disturbed, e.g., the user is giving a presentation or in a meeting, but wishes to provide his or her location to specific callers. When one of those callers attempts to call user from a calling station 154, the caller is informed the user is unavailable, and instead is offered the location of the user, e.g., the convention center.

Prior art find me/follow me services and apparatus allow callers or inquirers to locate users only by a specified destination, i.e., phone number or data device.

The addition of the GPS feature allows users to offer information to callers/inquirers about their present physical location and even offer directions to the user even if the user cannot be located at the specified locations. In one embodiment, the feature is controlled by a pass code—only authorized inquirers who provide the pass code when prompted by the locator service 136 are granted access to the user's location information.

Pager User Locator Service

In another aspect of the invention, the user of a mobile data device 112 also has a pager number and account (or similar messaging service) with a pager service that also defines locator service 136. The data device 112 registers its identity with a locator service 136. The data device 112 continually registers its location, e.g., using the GPS receiver 16, to the locator service 136. When a user dials, e-mails, or otherwise contacts the locator service 136, the inquiring party is given information on the location of the user, and also given directions to the user.

For example, a caller using a phone 154 dials a user's pager number, and enters a pass code to obtain information on the user's location. The paging service that handles the user's pager number supplies user's location and, if requested, directions on how to reach the user, e.g., downtown convention center, room 350. The paging service can be the locator service 136 or, in an alternative embodiment, a separate pager service 162 that queries the locator service 136.

Prior art paging services currently offer messaging features. This aspect of the invention adds the ability for a caller to obtain information about the user's location when dialing their pager number.

User Locator Service Upon Incomplete Call

Another aspect of the invention provides a method and apparatus to provide the location of a user to a caller who encounters Ring No Answer, Busy, Answering Machine Detection, Detection of answering service, or other incomplete call detection.

The data device 112 registers its identity with a locator service 136. The data device 112 continually registers its location, e.g., using the GPS receiver 16, to the locator service 136. The user configures an account with the locator service 136 to notify callers (or particular callers) of his or her location when the telephony network detects a non-completion of a call to the user, e.g., Ring No Answer or Answering Machine Detection. When a caller using a phone 156 attempts to call the user, and the telephony network 48 detects a non-completion (and the caller is a caller that the user has indicated as being one to whom location information should be provided), the telephony network 48 signals a processor 164. The processor 164 in turn queries the locator service 136 for the user's current location. The processor 164 then sends this information to an audio device 166, which translates the information into speech. The telephony network 48 delivers this speech to the caller's phone 154.

For example, a caller, using the phone 154, dials the number for his grandmother's phone 156. In response to the system 48 detecting a non-live answer condition, the system 48 selectively offers the caller at phone 154 (based on PIN, ANI or other caller ID information) the ability to obtain information on the grandmother's whereabouts and directions on how to get to her. The call may then continue (e.g., allowing the caller to leave a message on an answering machine), after the caller is provided with location information.

Prior art messaging products provide callers the ability to leave messages at a later time if the called party is unavailable. These products include Card Messenger, Collect Messenger and Dial 1 Messenger. Callers do not have the ability, however, to obtain information about the user's whereabouts with such prior art products.

This aspect of the invention provides the ability for callers, upon encountering a condition where the called party cannot be reached, to obtain information about the called party's current location. This aspect of the invention provides a network-provided service, and does not rely upon user equipment. This aspect of the invention instead makes use of call progress detection of busy, Ring No Answer, fast busy, modem, answering machine, timeout, SIT tones, ringback stopped, or other non-live answer condition.

Directory Assistance—Find What's Near Me

Another aspect of the invention provides a method and apparatus to search for telephony directory listings that are located near a person's present location. The data device 112 registers its identity with a locator service 136. The data device 112 continually registers its location, e.g., using the GPS receiver 16, to the locator service 136. When the user wishes to locate a directory listing, or wishes to locate a listing near the user's present location, the locator service 136 utilizes the user's present location to query a directory listing (e.g. Mapquest™, Jeppeson™, telephone company electronic database or other non-telephone company database). In one embodiment, a database is provided having directory listings are indexed by location. Thus, listings are offered to the user by distance from the user's present location. In one embodiment, the user can specify the search radius, i.e., the distance from the listing to the user's present location.

For example, a user in a new city on business accesses the MCIW™ web directory listing service via a device 112, and requests a search of restaurants within a half-mile radius of his or her present location.

In the prior art, users would inquire about directory listings based solely on the location of the listing. The method and apparatus of the invention adds the user's location to the search criteria. A user can search for directory listings, either by name, number, subject, etc., within a specified radius of the user's present location.

Note that the assignee of the present invention currently offers directory assistance services. The addition of GPS type data and user tracking adds an additional and novel feature to these services.

The protection sought is not to be limited to the disclosed embodiments, which are given by way of example only, but instead is to be limited only by the scope of the appended claims as properly interpreted in accordance with the doctrine of equivalents.

What is claimed is:

1. A method of locating a user of a mobile data device, the method comprising:
   registering the identity of the mobile data device with a locator service, the mobile data device determining location of the user using a Global Positioning System (GPS) receiver of the mobile data device; the mobile data device transmitting the determined location to the locator service using a wireless transponder of the mobile data device;
   in response to an inquiry as to the location of the user of the mobile data device, the locator service responding with the determined location; and
   configuring an answering machine to communicate with the locator service and to pass the determined location of the mobile data device received from the locator service to a caller who calls the answering machine.

2. A method in accordance with claim 1, wherein the answering machine is Internet-ready.

3. A method in accordance with claim 2, wherein the caller calls from a Public Switched Telephone Network (PSTN).

4. A method in accordance with claim 1, and further, wherein the answering machine supports data communication in addition to voice communication.

5. A method in accordance with claim 1, wherein the locator service supports a find me/follow me service for the mobile data device.

6. A method in accordance with claim 1, wherein the locator service supports a paging service for the mobile data device.

7. A method in accordance with claim 1 and further comprising generating an inquiry as to the location of the user of the mobile data device in response to an incomplete attempt to call the user with a telephone.

8. A method in accordance with claim 1 and further comprising generating an inquiry as to the location of the user of the mobile data device in response to an incomplete attempt to call the user with a telephone, the method further comprising passing information identifying the location of the user to the telephone.

9. A method in accordance with claim 1 and further comprising generating an inquiry as to the location of the user of the mobile data device in response to an incomplete attempt to call the user with a telephone, the method further comprising passing information identifying the location of the user to the telephone if the telephone is associated with a number on a list of predetermined telephone numbers to which location information can be provided.

10. A method in accordance with claim 9 wherein the list of predetermined telephones is defined by the user using the locator service, the method further comprising determining if the telephone is on the list using caller ID.

11. The method in accordance with claim 1, wherein a nearest assistance provider is determined based on a threshold.

12. A mobile data device for communicating with a locator service, the device comprising:
   a Global Positioning System (GPS) receiver configured to determine location of the user;
   a wireless transponder configured to transmit the determined location to the locator service, wherein the mobile data device is registered with the locator service;
   a database configured to store data on a plurality of assistance providers, wherein a nearest one of the assistance providers is determined based on the determined location and compatibility of communication protocol supported by the wireless transponder and the assistance providers; and
   a processor configured to establish communication with the nearest assistance provider using the corresponding communication protocol via the wireless transponder,
   wherein an answering machine is configured to communicate with the locator service and to pass the determined location of the mobile data device received from the locator service to a caller who calls the answering machine.

13. A mobile data device in accordance with claim 12 wherein the location is continually transmitted to the locator service.

14. A mobile data device in accordance with claim 12, further comprising:

a panic button for initiating a request for emergency assistance.

15. A mobile device in accordance with claim 12 and further comprising an A/D converter having a digital output coupled to the processor and having an analog input configured to be coupled to a vital signs detector, the mobile data device being configured to transmit a request for emergency assistance, using the transponder, in response to detection of a change in the signal from the vital signs detector indicative of an emergency condition.

* * * * *